United States Patent [19]

Fischell

[11] 4,422,330

[45] Dec. 27, 1983

[54] LOW SUSCEPTIBILITY PROOF MASS FOR A SINGLE AXIS DRAG COMPENSATION SYSTEM

[75] Inventor: Robert E. Fischell, Silver Spring, Md.

[73] Assignee: The United States of America as represented by the Secretary of the Navy, Washington, D.C.

[21] Appl. No.: 261,353

[22] Filed: May 7, 1981

[51] Int. Cl.³ .............................................. G01P 15/08
[52] U.S. Cl. ..................................... 73/517 R; 308/10
[58] Field of Search ................. 73/505, 517 B, 517 R, 73/516 R; 74/5, 5.6 E; 308/10; 244/164, 166

[56] References Cited

U.S. PATENT DOCUMENTS

| | | | |
|---|---|---|---|
| 3,508,445 | 4/1970 | Penney et al. | 73/517 B |
| 3,552,028 | 1/1971 | Simon | 73/517 B |
| 4,170,904 | 10/1979 | Fischell et al. | 74/5.6 E |

*Primary Examiner*—James J. Gill
*Attorney, Agent, or Firm*—Richard S. Sciascia; Harvey A. David

[57] ABSTRACT

A satellite single axis drag compensation system improves stability and effects damping of movements of a cylindrical proof mass by providing an elongated, perpendicularly magnetized permanent magnet in the core of a current carrying rod that extends coaxially through a central bore of the proof mass, the proof mass being constructed as a composite structure of alternate cylindrical layers of diamagnetic silver and paramagnetic aluminum to reduce magnetic susceptibility thereof.

8 Claims, 3 Drawing Figures

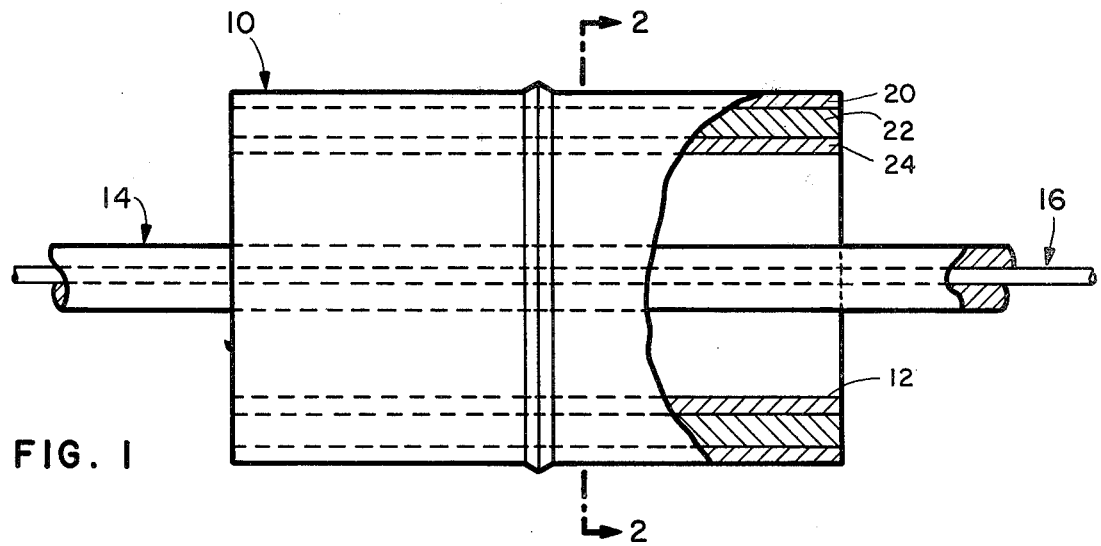
FIG. 1
FIG. 2
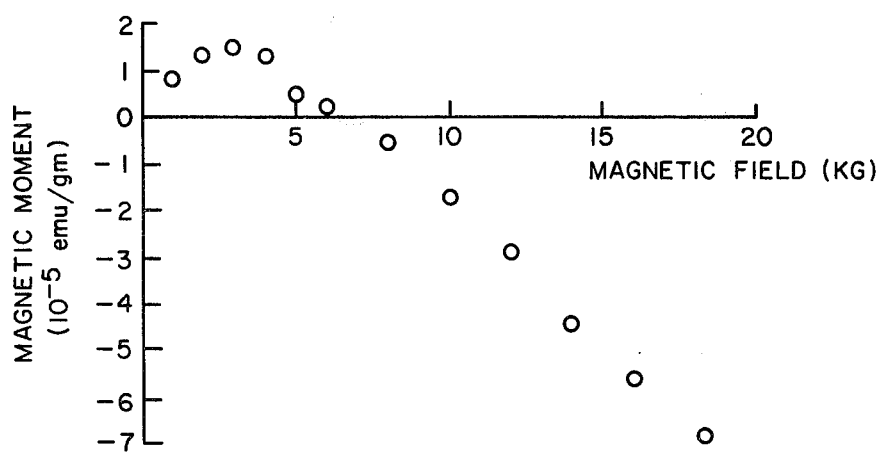
FIG. 3

LOW SUSCEPTIBILITY PROOF MASS FOR A SINGLE AXIS DRAG COMPENSATION SYSTEM

BACKGROUND OF THE INVENTION

It is generally well-known in the art of satellite control to provide an unsupported proof mass aboard a satellite, shielded from external non-gravitational forces so that it follows a purely gravitational orbit during operation of the satellite, and means responsive to motion of the satellite relative to the proof mass for controlling thrusters onboard the spacecraft which force the spacecraft to also follow the gravitational orbit, free from the effects of external surface forces such as solar radiation pressure and atmospheric drag. As a result, satellite position in orbit is predictable well in advance, thus significantly increasing the value of the satellite for navigational purposes for example.

One major problem which was encountered in the use of early disturbance compensation systems of this type involved in the need for very accurately determining mass attraction forces between satellite-carried components and the proof mass, in order to prevent such mass attraction forces from influencing the proof mass and thereby providing faulty operation of the system. In an effort to overcome the problem of mass attraction forces, U.S. Pat. No. 3,785,595 proposed the use of movable compensation masses or chargeable magnets (reacting with a diamagnetic proof Mass), on three orthogonal axes relative to the proof mass, which could be controlled by commands from the ground tracking station, once the spacecraft was in orbit, to set up forces which counterbalance the mass attraction forces.

U.S. Pat. No. 4,170,904 discloses a single-axis disturbance compensation system that is much simpler, for example, than the previous three-axis compensation system disclosed in U.S. Pat. No. 3,785,595. The single-axis compensation system of U.S. Pat. No. 4,170,904 utilizes a proof mass fabricated from electrically conductive material which is suspended electromagnetically, by eddy current forces, to counterbalance mass attraction forces due to the spacecraft, while moving with essentially no friction along an axis aligned with the velocity vector of the spacecraft. The proof mass is housed in an enclosure attached to the spacecraft, shielded from all non-gravitational exterior forces such as solar radiation pressure, atmospheric drag and electrostatic attraction forces, so that the proof mass follows a purely gravitational orbit. A controlled magnetic biasing field is generated within the enclosure adjacent to the proof mass and exerts a preselected and controlled eddy current biasing force level on the proof mass in order to balance any along axis constant component of proof mass disturbance force. Essentially, this biasing system comprises two oppositely wound coils each configured to provide a constant force over the proof mass range of motion. In order to assure that the proof mass always reacts in a constant fashion to the biasing magnetic field, a thermal control system is provided in order to assure constant resistivity of the proof mass materials.

When the satellite is placed into orbit and is controlled to assume its orbital configuration, the proof mass is positioned at the center of mass of the spacecraft in alignment with the velocity vector. An optical detection system then monitors any movement of the proof mass both along and transverse to the velocity vector, as results from external forces on the satellite due to solar radiation pressure and atmospheric drag. The output of the optical detection system is utilized to operate thruster control apparatus which force the satellite to maintain a substantially constant relative position with respect to the proof mass and whereby the satellite is also caused to follow the purely gravitational orbit.

SUMMARY OF THE INVENTION

The present invention provides certain improvements in the foregoing single-axis compensation system, particularly in the proof mass and in the suspension thereof, which improvements minimize coning, tilting, and other undesirable motions of the proof mass as it moves along the current carrying rod, while keeping the proof mass compatible with predetermined design suspension and along track forces.

With the foregoing in mind, it is a principle object of the invention to provide, in a single-axis drag compensation system of the type described earlier, an improved proof mass and suspension system.

Another object of the invention is to improve stability of a cylindrical proof mass, that is coaxially suspended relative to an axial current carrying rod by eddy current repulsion, through the provision of permanent magnet means forming part of the current carrying rod and effective to damp motions of the proof mass relative to the rod.

As another object, the invention aims to provide a proof mass construction having reduced magnetic susceptibility.

Still another object is to provide a combination of a low susceptibility proof mass and a central or axial current carrying rod including a permanent magnet, whereby undesired proof mass motions are effectively damped while permitting necessary and desired deviation sensing motions.

As another object, the invention aims to accomplish the foregoing objects and advantages, as well as others, through certain novel constructions, combinations, and arrangements of parts as will all become apparent from the following detailed description of a presently preferred embodiment when read in conjunction with the accompanying drawings.

DESCRIPTION OF THE DRAWINGS

FIG. 1 is a side elevational view of a composite proof mass and an axial current carrying rod embodying the present invention, with portions broken away to illustrate other portions;

FIG. 2 is a sectional view of the proof mass and rod of FIG. 1; and

FIG. 3 is a graphic illustration of magnetic moment versus field strength of a proof mass according to this invention.

DESCRIPTION OF THE PREFERRED EMBODIMENT

Referring to FIG. 1, a proof mass 10 of generally right cylindrical form is provided with a central bore 12 and surrounds an axial current carrying rod 14. The proof mass 10 and rod 14 form part of a single-axis drag compensation system of the type disclosed in the aforementioned U.S. Pat. No. 4,170,904 to which reference may be had for a description of the system as a whole. Suffice it to say here about that system that the proof mass 10 is radially supported when in orbit by eddy current repulsion, the eddy currents being set up in the conductive material of the proof mass by a high frequency, e.g., 2.08 KHz, alternating current in the rod 14, that the proof mass is axially positioned by axial biasing magnetic forces generated by solenoid windings (not shown), and that radial and axial movements of the proof mass relative to its temperature regulated housing are sensed by photo-optical means, also not shown. The sensed movements, in particular the axial movements, are used to control the axial velocity correcting thrusters of the host satellite.

In the exemplary embodiment being described, the proof mass has a length of 3.15 cm, an outside diameter of 1.54 cm, and an inside diameter of 1.04 cm. The diameter of the rod 14 is such as to provide sufficient rigidity to resist bowing or other deflection.

In accordance with this invention, and for the purpose of damping movements of the proof mass 10 and improving stability and maintenance of alignment of the longitudinal central axis thereof coincident with the axis of the rod 14, an elongated, rod-shaped permanent magnet 16 is disposed in an axial bore of that rod. The magnet 16 is preferably formed of the various well known permanent magnet alloys, such as that sold under the tradename or designation "VICALLOY," that can be conveniently extruded into a thin rod or wire having a diameter on the order of say 20 mils. The magnet 16 is magnetized uniformly along its length, which is preferably considerably greater than the length of the proof mass 10, and in fact may extend substantially the full length of the rod 14. The magnetizational of the magnet 16 is perpendicular to its long axis and preferably varies no more than 1% throughout its length.

Ideally, the proof mass 10 would have, in addition to being formed of a highly conductive material subject to eddy current generation, a low susceptibility so that it would not exhibit any magnetic moment due to retained magnetism and would be subject only to eddy current repulsion forces generated for suspension and axial biasing purposes. In the practical embodiment being described, the proof mass volume susceptibility must be $\leq 7.8 \times 10^{-8}/cm^3$. Also, because the eddy currents induced in the proof mass must provide sufficient suspension force, the product of resistivity times density is required to be 20 $\mu\Omega.gm/cm^2$ or less. In accordance with the present invention, the proof mass 10 comprises a composite structure including a plurality of concentric cylinders having diamagnetic and paramagnetic susceptibilities that substantially cancel or offset one another so as to result in a composite proof mass having a notably reduced effective magnetic susceptibility and correspondingly low residual magnetism even after having been subjected to a substantial magnetic field.

To that end, and as is best seen in FIG. 2, the proof mass 10 comprises an outer cylinder 20 of silver, an intermediate cylinder 22 of aluminum, and an inner cylinder 24 of silver, these cylinders being assembled to form a unitary proof mass wherein the cylinders constitute alternate layers of paramagnetic and diamagnetic material. The dimensions of the cylinders are chosen so that the net diamagnetic susceptibility of silver in the proof mass 10 would cancel the paramagnetic susceptibility of aluminum therein in a uniform field and in a field which falls off as the inverse square of the distance from the axis. Again, in the present example being described, the resulting resistivity times density is 12.7 $\mu\Omega.gm/cm^2$, well within the requirement mentioned above.

The composite proof mass 10 is conveniently formed by machining the individual cylinders 20, 22, and 24 to interference tolerances, anodizing the aluminum cylinder, and then assembling the proof mass by first cooling inner pieces in liquid nitrogen and heating outer pieces to 150° C. After assembly, the proof mass is sputtered with a 0.3 $\mu m$ coating of chromium followed by 3.5 $\mu m$ of gold to provide an inert outer surface and electrical continuity at the ends thereof.

The resulting composite proof mass, when tested on a force balance magnetometer and on a SQUID second order gradiometer in varying fields of from 1 kG to 20 kG, yields a plot of magnetic moment versus field as illustrated in FIG. 3. The slope is gram susceptibility and magnetic impurities are indicated by the hump. The SQUID used for these tests is capable of detecting a magnetic dipole of $2 \times 10^{-6}$ pole-cm and a magnetic susceptibility of about $6 \times 10^{-8}/cm^3$. To make susceptibility measurements with the SQUID, a uniform field of about 10 G was induced at the pickup coil. Then, system response to the sample was compared with response to a geometrically similar specimen of silver.

It should be noted that precautions are preferably taken in the fabrication and handling of the composite proof mass 10 to avoid possible contamination with any ferromagnetic material that could produce a residual magnetization that might so interact with the magnet 16 as to exceed the suspension force. For example, it is preferred to use "STELLITE" alloy tools for machining the cylinders rather than high speed steel tools.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A satellite single axis drag compensation system of the type including a cylindrical proof mass of predetermined length and a longer conductive rod extending coaxially through a central bore of said proof mass and adapted to carry a current for inducing eddy currents in said proof mass for suspension thereof by repulsion forces, said system being characterized by the improvement comprising:
    an elongate, permanent magnet element, carried by said conductive rod, said element being coaxial with said rod and having a length greater than said predetermined length and being magnetized perpendicularly to its axis and uniformly along its length whereby movements of said proof mass are damped; and
    said proof mass comprising a plurality of concentric cylindrical layers of conductive material, said layers of conductive material being alternately of diamagnetic and of paramagnetic susceptibility, whereby total susceptibility of said proof mass is below a level that will interact with said permanent magnet element with sufficient force to overcome said repulsion forces.

2. A satellite single axis drag compensation system as defined in claim 7, and wherein:

said permanent magnet element is in the form of a wire or rod and the magnetization thereof varies by less than about 1% throughout its length.

3. A satellite single axis drag compensation system as defined in claim 2, and wherein:
said permanent magnet element is disposed in an axial central bore of said current carrying conductive rod.

4. A satellite single axis drag compensation system as defined in claim 3, and wherein:
said proof mass comprises outer and inner layers of said diamagnetic material, and an intermediate layer of said paramagnetic material.

5. A satellite single axis drag compensation system as defined in claim 4, and wherein:
said diamagnetic material comprises substantially pure silver; and
said paramagnetic material comprises substantially pure aluminum.

6. A compensation system as defined in claim 4 and wherein:
said proof mass is characterized by a mass volume susceptibility that is equal to or less than about $7.8 \times 10^{-8}/cm^3$.

7. An article of manufacture for use in apparatus requiring the article to have low total magnetic susceptibility and low residual magnetism, said article comprising:
a composite body including alternate layers of paramagnetic and diamagnetic material, the net paramagnetic susceptibility of said paramagnetic material in said layers being substantially equal in magnitude to the net diamagnetic susceptibility of said diamagnetic material in said layers.

8. An article of manufacture as defined in claim 7, and wherein: said diamagnetic material comprises substantially pure silver; and said paramagnetic material comprises substantially pure aluminum.

* * * * *